Nov. 22, 1960 W. HANSTEIN, JR 2,961,079
FRICTION CLUTCH
Filed May 24, 1956

*INVENTOR.*
WALTER HANSTEIN, JR.

AGENT

United States Patent Office 2,961,079
Patented Nov. 22, 1960

2,961,079
FRICTION CLUTCH

Walter Hanstein, Jr., Rosemont, Pa., assignor to Burroughs Corporation, Detroit, Mich., a corporation of Michigan Filed May 24, 1956, Ser. No. 587,058

4 Claims. (Cl. 192—30)

The present invention relates to clutches, and more particularly to a friction drive clutch for transmitting intermittent or continuous motion.

In mechanisms for controlling accumulator counters, for example, and those more specifically for use in computers where a plurality of friction clutches have a common drive means, it has been found difficult to harmonize the action of the several clutches in order to obtain precise operation of controlled parts. A minute variation of output torque in one of such clutches can introduce error in the required result or setting. Variations of temperature and humidity of the ambient atmosphere are causes affecting the critical output. Also where springs are used as biasing means, variations of tension pose another disturbing factor.

An object of the invention is to provide a friction clutch wherein the output from a supplied torque is maintained substantially constant.

It is also an object to provide a reversible clutch where the applied torque varies according to the direction of rotation of the driving shaft.

Another object is to provide a friction clutch wherein the torque applied in one direction is greater than when applied in the reverse direction.

A further object is to provide a clutch wherein torque transmitting parts operate by substantially continuous circumferential surface contact.

A still further object is to provide a clutch to operate as an asymmetrical transmission unit.

Another object of the invention is to provide a clutch having no axial thrust thus eliminating the need for thrust bearings and then attendant difficulties.

Other objects and advantages of the present invention will be found throughout the following more detailed description, particularly when considered with the accompanying drawings, in which like reference characters refer to similar elements, and wherein.

Figure 1:
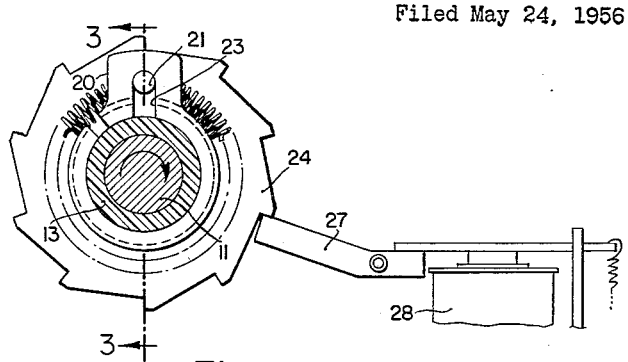
Figure 1 is an end view of a friction clutch embodying one form of the invention and shown, in this instance, interposed between a driving shaft and a gear arranged to produce intermittent motion.
Figure 2:
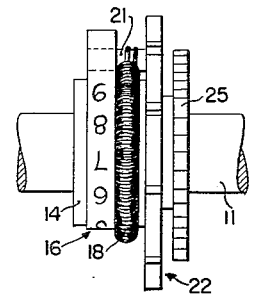
Figure 2 is a side view of the same.
Figure 3:
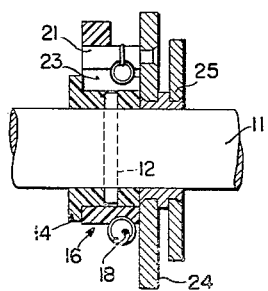
Figure 3 is a sectional view taken on line 3—3 of Figure 1.

Referring to the drawings, and more particularly to Figures 1 through 4, the driving member of the clutch comprises a bushing 10 mounted upon a torque applying shaft 11 for rotation therewith by a pin 12 radially entering the bushing 10 and shaft 11. A key can serve the same purpose as will be understood. Bushing 10 has a circumferential friction surface 13, bounded at one end by a peripheral flange 14, and is preferably formed of nylon because of its ease of fabrication, its excellent wearing qualities, and its quiet operation.

The driven member of the clutch is in the form of a split or discontinuous ring 16, preferably of nylon, encircling and seated on bushing 10 against flange 14, and with its ends spaced apart to provide a clearance or gap 17 permitting the required wrap-around gripping action for transmitting torque to a suitable output for intermittent or continuous motion according to requirements. This gripping action is obtained by a coiled spring 18, positioned in a marginal peripheral groove 19 in ring 16 and stretched about the ring with its ends connected to a pin 21 projecting laterally from the juxtaposed face of a driven member 22. Lug 20 is integral with ring 16 and has an aperture or slot 23 in which pin 21 is engaged in order to rotate output member 22 in either direction as determined by the clockwise or counter-clockwise rotation of shaft 11.

In the preferred construction, ring 16 is asymmetrical with respect to pin 21 since gap 17 of the ring is located circumferentially in close proximity to lug 20 so that as shaft 11 rotates clockwise, as indicated by the arrow of Figure 1, ring 16 is wound under maximum torque. The opposite rotation of shaft 11 imparts an unwinding action to ring 16 under a diminished torque. In the particular circumferential location of gap 17 as shown in Figure 1, an applied reversing torque is approximately one-half of that applied for the winding torque. Thus the clutch is self-energizing for maximum torque and is self-deenergizing for minimum torque.

Figure 4:
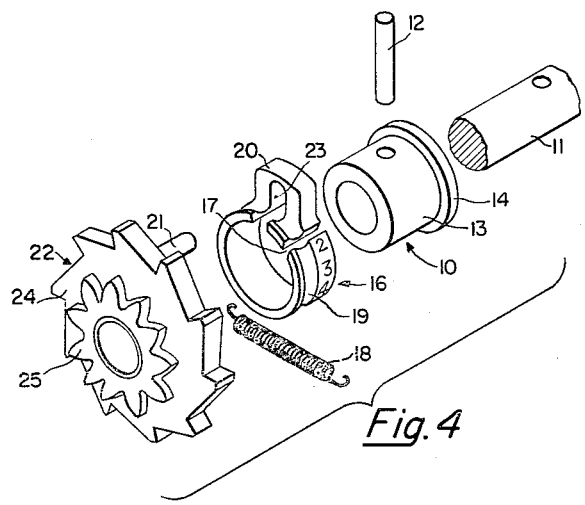
Figure 4 is an exploded perspective view of the clutch assembly.

As shown in Figure 4, the output member 22 includes a stepped wheel 24 and a gear 25, the latter being provided for drivingly connecting the device with associated apparatus. The output may be associated with a switching operation such as shown in the pending application of William W. Deighton, filed March 4, 1955, Serial No. 492,247, now Patent No. 2,906,838, granted September 29, 1959, and assigned to the assignee of the present invention.

Figure 5:
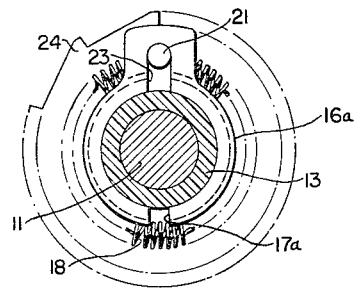
Figure 5 is an end elevation view of a modified form of the invention.

In the modification shown in Figure 5, the parts of the clutch are the same as described above and so assembled, however, it should be noted that ring 16a corresponding to ring 16, in the above described form, is divided medially so that as assembled the clearance or gap 17a is diametrically opposite pin 21. Because this location of the gap makes ring 16a symmetrical about drive pin 21, the transmitted torque is the same for both clockwise and counterclockwise rotation of shaft 12.

In the operation of the device, as illustrated in Fig. 1, wheel 24 normally is held against movement by the escapement means, including pawl 27 and solenoid 28, during which time clutch ring 16 slips under the applied torque of shaft 11, which, as indicated by the arrow, is rotating in a clockwise direction. Upon release of holding pawl 27 by de-energizing solenoid 28, ring 16 grips bushing 10 and transmits motion by way of lug 20 and pin 21 to the output 22 and thence to apparatus drivingly engaged with gear 25, but not shown in the drawings. It is understood, of course, that the driven apparatus may be a rack or a gear in mesh with gear 25 of the output apparatus.

While the apparatus, as shown in Fig. 1, has been shown associated with a drive shaft 11 adapted to be rotated in a clockwise direction it is quite obvious that other applications of the device in accordance with the inventive concept herein set forth may as easily be made. For example, shaft 11 may be oscillated rather than rotated in one direction. In which case, and during rotation thereof in the counterclockwise direction, the clutch is self-de-energizing as rotation of shaft 11 in a counterclockwise direction imparts an unwinding action to ring 16 under a diminishing torque, an action which is further enhanced by the inertia of the apparatus being driven by gear 25. Upon reversing of the direction of rotation of shaft 11, a winding torque is applied to ring 16 under a maximum torque for operation upon de-energization of solenoid 28.

With reference to the modification shown in Fig. 5 it will be seen that the torque in both directions of rotation of shaft 11 will be equal and thus it is possible to obtain a step by step operation, using pawl 27 as a stop member, preventing rotation of the member 24 during rotation of the shaft in one direction. In this case pawl 27 will be held stationary. It is also obvious from reference to Fig. 5 that by changing the contour of output member 24, or by not using this member at all that output gear 25 may be rotated in either direction under equal torque.

Figure 6:
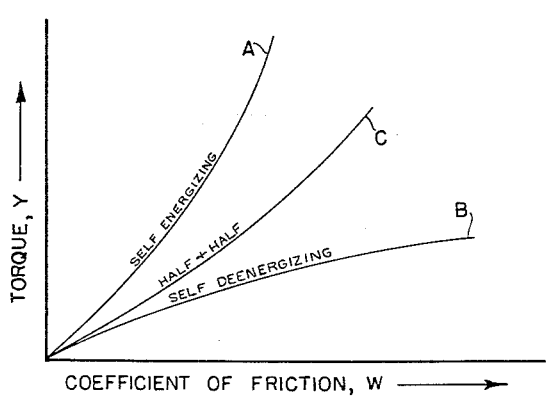
Figure 6 is a graph illustrating torque transmitted by the clutch as a function of the coefficient of friction of the clutch materials.

To further illustrate the operating characteristics of the invention, reference may be had to Figure 6 wherein the curves represent torque versus coefficient of friction. It will be noted that the asymmetrical clutch of Figures 1 through 4, when driven in a clockwise direction, as seen in Figure 1, and as indicated by line A on Figure 6, delivers a greater torque than when driven in the opposite or deenergizing direction as represented by line B.

The advantage of using a clutch with these characteristics is that it overcomes the difficulty in prior devices of maintaining a constant torque, particularly where stepping switches of the type used in computers are concerned. A reason for such torque variation is a change in coefficient of friction which varies for a number of reasons, such as change in temperature, change in the condition of lubrication, and change in characteristic of the surface involved as a result of wear. It is highly desirable to have a clutch which is quite insensitive to those variations, and the asymmetrical clutch when driven in the deenergizing direction fulfills this requirement. The symetrical clutch, while more dependent on change of coefficient of friction, gives good results where the drive is in two directions, that is, alternately in one direction or the other with the same torque in both directions, as illustrated by line C in Figure 6.

The split ring gripping member 16 may be made responsive to selected applied torque by changing the peripheral location of gap 17 between the ends of the ring with reference to the drive of the output member. Thus where a maximum torque is applied for shaft rotation in one direction, and a minimum torque applied for shaft rotation in the reverse direction, the gap will be located in relatively close proximity to the output drive of the clutch. On the other hand for equal torque in both directions of shaft rotation, the clearance will be arranged medially of the split ring and diametrically opposite to the output drive member so that the clutch functions symmetrically.

A feature of the invention resides in the long split ring biasing spring which is stretched around the split ring to give a long continuous friction gripping surface about its circumference as opposed to tangential line contact. Furthermore, such a spring compensates for structural variations in spring material so that a plurality of such springs operating in the same assembly do so without errors normally occurring by such variations in prior constructions.

From the foregoing it will be seen that a novel friction clutch has been devised to be operated as an asymmetrical as well as a symmetrical power transmitting unit, the former being preferred where it is desired to have more torque in one direction than in the other, while the latter delivers an equal torque for either direction of rotation.

I claim:

1. A friction clutch comprising, a rotatable drive shaft, a flange-like output member rotatable on said shaft and having a plurality of notches formed around its outer periphery, a pin projecting axially from said output member, a discontinuous ring encircling said shaft adjacent said output member, a radially extending lug on said ring, said lug having a radially extending slot, said pin extending into said slot for transmitting rotation of said ring to said output member, a coil spring encircling said ring with its ends attached to said pin under tension thus to urge said ring to grip said shaft, the ends of said discontinuous ring forming gap means spaced peripherally from said slot to secure a desired predetermined applied output torque, releasable means for engaging said output member by means of said notches to prevent rotation of said output member and said ring when said shaft is rotating, and means to withdraw said releasable means from its engagement with said notches to permit at least a portion of said ring to wrap tightly around said shaft to cause rotation of said output member by said ring.

2. A friction clutch comprising, a rotatable drive shaft, a flange-like output member rotatable on said shaft and having a plurality of notches around its outer periphery, a pin projecting axially from said output member, a discontinuous ring encircling said shaft adjacent said output member, an integrally formed radially extending lug on said ring, said lug having a slot extending radially from the inner periphery of said ring to a point adjacent the outer end of said lug, said pin extending into said slot for transmitting rotation of said ring to said output member, a groove formed in the outer periphery of said ring axially displaced from said lug and on the side of said lug nearest said output member, a coil spring encircling said ring and lying in said groove said spring having its ends attached to said pin under tension thus to urge said ring to grip said shaft, the ends of said discontinuous ring forming gap means spaced peripherally from said slot to secure a desired predetermined applied output torque and cooperating with said slot to divide said ring into two shaft engaging portions, releasable means for engaging said output member by means of said notches thus to prevent rotation of said output member and said ring when said shaft is rotating, and means to withdraw said releasable means from its engagement with said notches to permit said spring to cause one portion of said ring to wrap into gripping engagement with said shaft thus to rotate said output member.

3. A construction according to claim 2 wherein said slot and said gap means divide said ring into two unequal shaft engaging portions effecting greater driving torque between the ring and the shaft when the latter is rotated in one direction than when rotated in the opposite direction.

4. A construction according to claim 2 wherein said gap means is diametrically opposite to said slot thus dividing said ring into equal shaft engaging portions effecting equal driving torque between said shaft and said ring when said shaft is rotated in either direction.

References Cited in the file of this patent

UNITED STATES PATENTS

| | | |
|---|---|---|
| 1,994,141 | Madden | Mar. 12, 1935 |
| 2,050,613 | Kellogg | Aug. 11, 1936 |
| 2,080,294 | Wheeler | May 11, 1937 |
| 2,705,113 | Bonanno | Mar. 29, 1955 |
| 2,868,001 | Russell | Jan. 13, 1959 |
| 2,869,697 | Marshall | Jan. 20, 1959 |

FOREIGN PATENTS

| | | |
|---|---|---|
| 125,562 | Germany | Nov. 19, 1901 |
| 14,736 | France | Nov. 27, 1911 |
| 402,576 | Germany | Sept. 20, 1924 |